United States Patent
Kim et al.

(10) Patent No.: US 10,356,324 B2
(45) Date of Patent: Jul. 16, 2019

(54) ACTUATOR AND DRIVING APPARATUS OF CAMERA MODULE FOR PREVENTING IMAGE SIGNAL DISTORTION DUE TO DRIVING MODE SWITCHING

(71) Applicant: SAMSUNG ELECTRO-MECHANICS CO., LTD., Suwon-si (KR)

(72) Inventors: Kyung Rin Kim, Suwon-si (KR); Gyu Won Kim, Suwon-si (KR); Chang Jae Heo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/798,470

(22) Filed: Oct. 31, 2017

(65) Prior Publication Data

US 2018/0278850 A1    Sep. 27, 2018

(30) Foreign Application Priority Data

Mar. 27, 2017    (KR) .......................... 10-2017-0038369

(51) Int. Cl.
*H04N 5/232*    (2006.01)
*G03B 5/00*    (2006.01)
*H04N 5/225*    (2006.01)

(52) U.S. Cl.
CPC ........... *H04N 5/23287* (2013.01); *G03B 5/00* (2013.01); *H04N 5/2257* (2013.01); *H04N 5/23254* (2013.01); *G03B 2205/0069* (2013.01)

(58) Field of Classification Search
CPC .................................................. H04N 5/23287
See application file for complete search history.

(56) References Cited

U.S. PATENT DOCUMENTS

| | | | | |
|---|---|---|---|---|
| 5,572,099 | A * | 11/1996 | Carobolante | H02P 23/186 318/400.17 |
| 2011/0234887 | A1 * | 9/2011 | Shimohata | G03B 3/10 348/353 |
| 2014/0211078 | A1 | 7/2014 | Watanabe | |

FOREIGN PATENT DOCUMENTS

| | | |
|---|---|---|
| JP | 2011-221519 A | 11/2011 |
| JP | 4877975 B2 | 2/2012 |
| JP | 10-2013-0077216 A | 7/2013 |
| JP | 5674618 B2 | 2/2015 |

* cited by examiner

*Primary Examiner* — Joel W Fosselman
(74) *Attorney, Agent, or Firm* — NSIP Law

(57) ABSTRACT

An actuator of a camera module includes a magnetic body, a driving coil disposed to face the magnetic body, and a driving apparatus including a driving circuit connected to the driving coil and selectively providing one of a first control signal and a second control signal to the driving circuit according to a driving mode. The driving apparatus compares a level of a control signal of a previous driving mode with a level of a control signal of a following driving mode upon the driving mode being switched.

17 Claims, 4 Drawing Sheets

ACTUATOR AND DRIVING APPARATUS OF CAMERA MODULE FOR PREVENTING IMAGE SIGNAL DISTORTION DUE TO DRIVING MODE SWITCHING

CROSS-REFERENCE TO RELATED APPLICATION(S)

This application claims benefit under 35 USC § 119(a) of priority to Korean Patent Application No. 10-2017-0038369 filed on Mar. 27, 2017 in the Korean Intellectual Property Office, the disclosure of which is incorporated herein by reference in its entirety.

BACKGROUND

1. Field

The following description relates to an actuator and a driving apparatus of a camera module.

2. Description of Related Art

In general, portable communications terminals such as cellular phones, personal digital assistants (PDA), portable personal computers (PC), and the like, are normally used to transmit image data, text, and/or audio data. In accordance with this trend, a camera module has recently been standardly installed in portable communications terminals in order to enable the capturing of image data, allow for video chatting, and other transmission of visual data.

Generally, a camera module includes a lens barrel in which a lens is included, a housing in which the lens barrel is accommodated, and an image sensor converting an image of a subject into an electrical signal. The camera module may employ a single focus camera module imaging objects with a fixed focus. However, in view of recent developments in camera technology, a camera module including an actuator to perform autofocusing has been employed. Further, a camera module sometimes employs an actuator to perform an optical image stabilization (OIS) function to reduce a resolution degradation phenomenon due to hand-shake. The optical image stabilization (OIS) function is applied in a scenario in which a captured image is blurred, by slowing down a shutter speed so that the image sensor can secure a larger amount of light at the time of capturing images in a low illuminance environment, as well as an influence on the image caused by shaking at the moment of activating the shutter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an example, there is provided an actuator and a driving apparatus of a camera module to prevent noise from being introduced into an image signal during execution of optical image stabilization (OIS) in a low illuminance environment.

In accordance with an embodiment, there is provided an actuator of a camera module, the actuator including: a magnetic body; a driving coil disposed to face the magnetic body; and a driving apparatus comprising a driving circuit connected to the driving coil and selectively providing one of a first control signal and a second control signal to the driving circuit according to a driving mode, wherein the driving apparatus may compare a level of a control signal of a previous driving mode with a level of a control signal of a following driving mode upon the driving mode being switched.

The driving apparatus may compare the level of the control signal of the previous driving mode with the level of the control signal of the following driving mode using a position of the magnetic body.

The driving apparatus may maintain the previous driving mode, upon deviation between the level of the control signal of the previous driving mode and the level of the control signal of the following driving mode being outside of a range of reference deviation.

The driving apparatus may switch the driving mode to the following driving mode, upon deviation between the level of the control signal of the previous driving mode and the level of the control signal of the following driving mode being within a range of reference deviation.

The driving mode may be determined according to an external illuminance.

The first control signal may drive the driving circuit in a linear driving mode, and the second control signal may drive the driving circuit in a pulse width modulation (PWM) driving mode.

The driving apparatus may generate the first control signal upon a level of the external illuminance being lower than a level of reference illuminance.

The driving apparatus may generate the second control signal upon a level of the external illuminance being higher than the level of reference illuminance.

The first control signal may be a driving signal having direct current (DC) signal form that may be applied to the driving coil, and the second control signal may be a driving signal of a PWM signal form that may be applied to the driving coil.

The driving apparatus may perform an optical image stabilization (OIS) function by moving a lens barrel having the magnetic body attached thereto in a direction perpendicular to an optical axis.

The driving circuit may include transistors connected to the driving coil in an H bridge form, and the first control signal and the second control signal are provided to gates of the transistors.

The external illuminance may be provided from an image processor performing image processing on an image signal.

The external illuminance may be provided from an illuminance sensor.

In accordance with an embodiment, there is provided a driving apparatus of a camera module, the driving apparatus including: a driving mode determiner configured to determine a driving mode of a driving coil based on an external illuminance; a controller selectively generating one of a first control signal and a second control signal based on the driving mode; and a driving circuit configured to drive the driving coil based on the first control signal and the second control signal, wherein the driving mode determiner may compare a level of a control signal of a previous driving mode with a level of a control signal of a following driving mode upon the driving mode being switched and based on the external illuminance.

The driving mode determiner relatively may compare the level of the control signal of the previous driving mode with the level of the control signal of the following driving mode using a position of a lens barrel.

The controller may maintain the previous driving mode, upon deviation between the level of the control signal of the previous driving mode and the level of the control signal of the following driving mode being outside of a range of reference deviation.

The controller may switch the driving mode to the following driving mode, upon the deviation between the level of the control signal of the previous driving mode and the level of the control signal of the following driving mode being within a range of the reference deviation.

The driving circuit may drive the driving coil in a linear driving mode according to the first control signal, and may drive the driving coil in a PWM driving mode according to the second control signal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Figure 1:
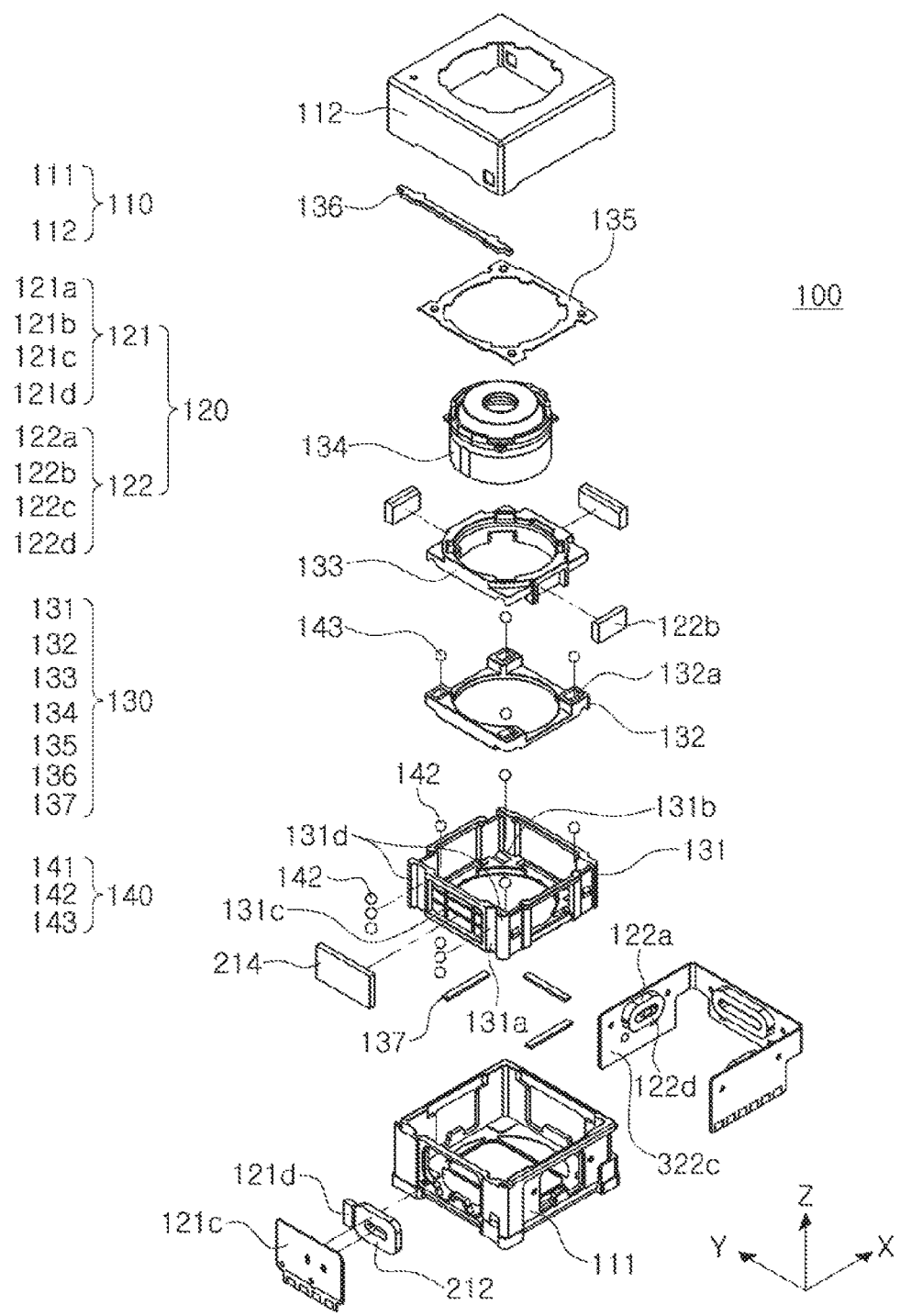
FIG. 1 is an exploded perspective view of a camera module, according to an embodiment.

FIG. 1 is an exploded perspective view of a camera module, according to an embodiment.

Referring to FIG. 1, a camera module 100, according to an embodiment, includes a housing unit 110, an actuator 120, and a lens module 130.

The housing unit 110 includes a housing 111 and a shield case 112. The housing 111 is formed of a material which is easily shaped. As an example, the housing 111 is formed of a plastic material or a polyurethane material. One or more actuators 120 are mounted on the housing 111. As an example, a portion of a first actuator 121 is mounted on a first side of the housing 111, and a portion of a second actuator 122 may be mounted on second to fourth sides of the housing 111. The housing 111 is configured to accommodate a lens module 130 therein. As an example, a space in which the lens module 130 is completely or partially accommodated is formed in the housing 111.

The housing 111 has a shape in which six sides thereof are open, each side having a frame defining a cavity, perforation, or hole. As an example, a hole having a quadrangular shape for an image sensor is formed in a bottom surface of the housing 111, and a hole having a quadrangular shape to mount the lens module 130 is formed in a top surface of the housing 111. Further, the first side of the housing 111 is open so that a first driving coil 121a of the first actuator 121 is inserted thereinto, the second to fourth sides of the housing 111 are open so that a second driving coil 122a of the second actuator 122 is inserted thereinto.

The shield case 112 is configured to cover a portion of the housing 111. As an example, the shield case 112 is configured to cover the top surface and the four side surfaces of the housing 111. In an alternative example, the shield case 112 is configured to cover only the four sides of the housing 111, or is configured to partially cover the top surface and the four side surfaces of the housing 111. The shield case 112 shields an electromagnetic wave generated during the driving of the camera module. The camera module generates the electromagnetic wave at the time of being driven. In an example in which the electromagnetic wave is emitted to the outside, the electromagnetic wave affects other electronic components possibly causing a communications problem or a malfunction. In order to prevent the communications problem and the malfunction, the shield case 112 is formed of a metal material and is grounded to a ground pad of a substrate mounted below the housing 111 to shield the electromagnetic wave. Further, when the shield case 112 is formed of a plastic injection-molding material, the electromagnetic wave is shielded by applying a conductive paint onto an inner surface of the shield case 112, or attaching a conductive film or a conductive tape onto the inner surface of the shield case 112. In this example, as the conductive paint, a conductive epoxy is used, but the conductive paint is not limited thereto, and various materials having conductivity may be used.

A plurality of actuators 120 are provided. As an example, the actuators 120 include a first actuator 121 that moves the lens module 130 in a direction of a Z axis, and a second actuator 122 that moves the lens module 130 in a direction of an X axis and a direction of a Y axis.

The first actuator 121 is mounted on the housing 111 and a first frame 130 of the lens module 130. As an example, a portion of the first actuator 121 is mounted on the first side of the housing 111, and the remaining portion of the first actuator 121 is mounted on a first side of the first frame 131.

The first actuator 121 includes mechanical and electrical components to move the lens module 130 in a direction of an optical axis, that is, the direction of the Z axis. As an example, the first actuator 121 includes a first driving coil 121a, a first magnetic body 121b, a first substrate 121c, and a first position detecting part 121d. The first driving coil 121a and the first position detecting part 121d are formed on the first substrate 121c. The first substrate 121c is mounted on the first side of the housing 111, and the first magnetic body 121b is mounted on the first side of the first fame 131 facing the first substrate 121c.

A first driving apparatus (not illustrated) providing a driving signal to the first driving coil 121a is provided on the first substrate 121c. The first driving apparatus provides or outputs a driving force to the first magnetic body 121b by applying the driving signal to the first driving coil 121a. The first driving apparatus includes a driver integrated circuit (IC) that provides or outputs the driving signal to the first driving coil 121a. In an example in which the driving signal from the first driving apparatus is output to the first driving coil 121a, a magnetic flux is generated from the first driving coil 121a, and the magnetic flux generated from the first driving coil 121a interacts with a magnetic field of the first magnetic body 121b to generate driving force enabling a relative movement of the first frame 131 and the lens barrel 134 with respect to the housing 111 based on Fleming's left-hand law. The first includes an H bride circuit that is driven bidirectionally to apply the driving signal to the first driving coil 121a in a voice coil motor mode or scheme.

The first actuator 121 detects positions of the first frame 131 and the lens barrel 134 by sensing strength of the magnetic field generated by the first magnetic body 121b using the first position detecting part 121d. As an example, the first position detecting part 121d includes a hall sensor. In one configuration, the hall sensor is positioned within the first driving coil 121a or adjacent to the first driving coil 121a. The first magnetic body 121b is disposed on one surface 131c of the first frame 131 as illustrated, and may also be disposed on one of corners 131d of the first frame 131.

The second actuator 122 is mounted on the housing 111 and a third frame 133 of the lens module 130. As an example, a portion of the second actuator 122 is mounted on the second to fourth sides of the housing 111, and the remaining portion of the second actuator 122 is mounted on second to fourth sides of the third frame 133. Meanwhile, the second actuator 122 may also be mounted on some surfaces of the first to fourth sides of the housing 111 and the third frame 133, and is also mounted on the second to fourth corners, at which the second to fourth sides are in contact with each other. The second actuator 122 includes a component to move the lens module 130 in a direction perpendicular to the optical axis. As an example, the second actuator 122 includes one or more second driving coils 122a, one or more second magnetic bodies 122b, a second substrate 122c, and one or more second position detecting parts 122d. The second driving coils 122a and the one or more second position detecting parts 122d are formed on the second substrate 122c. The second substrate 122c is substantially formed in a shape in which one side of a quadrangle is open, perforated, or with a hole or a cavity, and is mounted to surround the second to fourth sides of the housing 111. The second magnetic bodies 122b are each mounted on the second to fourth sides of the third frame 133 so as to face the second substrate 122c.

A second driving apparatus (not illustrated) provides the driving signal to the second driving coil 122a and is positioned on the second substrate 122c. The second driving apparatus applies a driving force to the second magnetic body 122b by outputting the driving signal to the second driving coil 122a. The second driving apparatus includes a driver integrated circuit (IC) that provides the driving signal to the second driving coil 122a. In an example, in response to the second driving apparatus producing, providing, or outputting the driving signal to the second driving coil 122a, a magnetic flux is generated from the second driving coil 122a, and the magnetic flux generated from the second driving coil 122a interacts with a magnetic field of the second magnetic body 122b. The second driving apparatus changes magnitude and a direction of a magnetic force generated between the second driving coils 122a and the plurality of second magnetic bodies 122b to enable a relative movement of the second frame 132 or the third frame 133 with respect to the first frame 131. The second driving apparatus includes an H-bridge circuit that is bidirectionally driven to apply the driving signal to the second driving coil 122a in a voice coil motor mode or scheme.

The lens barrel 134 moves along the optical axis direction along a movement of or in the same direction as the second frame 132 or the third frame 133 through the movement of the second frame 132 or the third frame 133. The second actuator 122 configured as described above detects positions of the lens barrel 134 and the second and third frames 132 and 133 by sensing strength of the magnetic field generated by the second magnetic body 122b using the second position detecting part 122d.

The lens module 130 is mounted in the housing unit 110. As an example, the lens module 130 is accommodated in a storage space formed by the housing 111 and the shield case 112 so as to be moved in at least three-axis direction. The lens module 130 includes a plurality of frames. As an example, the lens module 130 includes the first frame 131, the second frame 132, and the third frame 133.

The first frame 131 is configured to be movable to the housing 111. As an example, the first frame 131 moves in the direction of the optical axis (a direction of Z axis) of the housing 111 by the first actuator 121 described above. A plurality of guide grooves 131a and 131b are formed in the first frame 131. As an example, a first guide groove 131a extended to be elongated in the direction of the optical direction (the direction of the Z axis) is formed in the first side of the first frame 131, and second guide grooves 131b extended to be long in a first vertical direction (the direction of the Y axis) of the optical axis is each formed at four corners of an inner bottom surface of the first frame 131. The first frame 131 is formed in a shape in which at least three sides thereof are open. As an example, the second to fourth sides of the first frame 131 are open so that the second magnetic body 122b of the third frame 133 and the second driving coil 122a of the housing 111 may face each other.

The second frame 132 is mounted on the first frame 131. As an example, the second frame 132 is mounted in an inner space of the first frame 131. The second frame 132 is configured to be moved in the first vertical direction of the optical axis (the direction of the Y axis) with respect to the first frame 131. As an example, the second frame 132 moves in the first vertical direction of the optical axis (the direction of the Y axis) along the second guide groove 131b of the first frame 131. Guide grooves 132a are formed in the second frame 132. As an example, four third guide grooves 132a extended to be long in a second vertical direction of the optical axis (the direction of the X axis) are formed at corners of the second frame 132.

In one configuration, the first guide groove 131a is formed to have a different shape than the second guide grooves 131b. In one example, the first guide groove 131a has a U-shape groove, where the second guide grooves 131b have V-shaped or squared shaped grooves. In the alternative, the first guide groove 131a has a V-shape or square shape groove, where the second guide grooves 131b have U-shaped grooves. In an example, the first guide groove 131a and the second guide grooves 131b have the same groove shape. In another example, the second guide grooves 131b have the same groove shape. In a further example, the second guide grooves 131b have different groove shapes, such as U-shape, V-shape, or square shape.

The third frame 133 is mounted on the second frame 132. As an example, the third frame 133 is mounted on a top surface of the second frame 132. The third frame 133 is configured to be moved in the second vertical direction of the optical axis (the direction of the X axis) with respect to the second frame 132. As an example, the third frame 133 moves in the second vertical direction of the optical axis (the direction of the X axis) along the third guide groove 132a of the second frame 132. A plurality of second magnetic bodies 122b are mounted on the third frame 133. As an example, at least two second magnetic bodies 122b are each mounted on second to fourth sides of the third frame 133. In addition, as an example, three second magnetic bodies 122b are each mounted on the second to fourth sides of the third frame 133. Meanwhile, the third frame 133 described above may be formed integrally with second frame 132. In this example, the third frame 133 is omitted, and the second frame 132 moves in the first vertical direction of the optical axis (the direction of the Y axis) and the second vertical direction of the optical axis (the direction of the X axis).

The lens module 130 includes the lens barrel 134. As an example, the lens module 130 includes the lens barrel 134 including one or more lenses. The lens barrel 134 has a hollow cylindrical shape so that one or more lenses photographing a subject is accommodated therein. The lenses are included in the lens barrel 134 and positioned along the optical axis, from an object side to an image side. One or more lenses may be stacked as many as the number of the lenses according to a design of the lens barrel 134, and may have optical characteristics such as the same or different refractive indexes.

The lens barrel 134 is mounted in the third frame 133. As an example, the lens barrel 134 is inserted into the third frame 133 to be moved integrally with the third frame 133. The lens barrel 134 is configured to be moved in the direction of the optical axis (the direction of the Z axis) and the vertical directions (the directions of the X axis and the Y axis) of the optical axis. As an example, the lens barrel 134 moves in the direction of the optical axis (the direction of the Z axis) by the first actuator 121, and moves in the vertical directions of the optical axis (the directions of the X axis and the Y axis) by the second actuator 122.

As described above, the first actuator 121 is operated to perform an auto focusing (AF) function of the camera module 100, and the second actuator 122 is operated to perform an optical image stabilization (OIS) function of the camera module 100.

Furthermore, the lens module 130 includes a cover member 135, a ball stopper 136, and a magnetic body 137. The cover member 135 is configured to prevent a separation of the second frame 132 and the third frame 133 from the inner space of the first frame 131. As an example, the cover member 135 is coupled to the first frame 131 to prevent the second frame 132 and the third frame 133 from upwardly escaping from the first frame 131. In other words, a first movement of the second frame 132 and the third frame 133 in the optical axis direction is limited by the cover member 135. A second movement of the second frame 132 and the third frame 133 in the direction perpendicular to the optical axis is guided by the cover member 135.

The ball stopper 136 is mounted on the first frame 131. As an example, the ball stopper 136 is disposed to cover the first guide groove 131a of the first frame 131 to prevent a separation of a first ball bearing 141 mounted in the first guide groove 131a.

The magnetic body 137 are mounted in the first frame 131. As an example, the magnetic body 137 are mounted on one or more sides of the second to fourth sides of the first frame 131 to generate attraction force with the second driving coils 122a and the second magnetic bodies 122b of the second actuator 122. The magnetic body 137 configured, as described above, secure the positions of the second frame 132 and the third frame 133 with respect to the first frame 131 in an inactive state of the actuator 120. As an example, the lens module 130 is maintained at a constant position within the housing 111 by the attraction force between the magnetic body 137 and the second driving coil 122a.

A ball bearing part 140 is configured to smoothly move the lens module 130. As an example, the ball bearing part 140 is configured to smoothly move the lens module 130 in the direction of the optical axis and the vertical directions of the optical axis. The ball bearing part 140 is classified into a first ball bearing 141, a second ball bearing 142, and a third ball bearing 143, depending on an arrangement position thereof. As an example, the first ball bearing 141 is disposed in the first guide groove 131a of the first frame 131 to smoothly move the first frame 131 in the direction of the optical axis. As another example, the second ball bearing 142 is disposed in the second guide groove 131b of the first frame 131 to smoothly move the second frame 132 in the first vertical direction of the optical axis. As another example, the third ball bearing 143 is disposed in the third guide groove 132a of the second frame 132 to smoothly move the third frame 133 in the second vertical direction of the optical axis.

As an example, each of the first and second ball bearings 141 and 142 includes at least three balls, and the at least three balls of each ball bearing are each disposed in the first or second guide groove 131a or 131b. Further, each of the first and second ball bearings 141 and 142 may include four balls, and the four balls of each ball bearing may be each disposed in the first or second guide groove 131a or 131b. A lubrication material, fluid, or substance is used to reduce friction and noise in the portions in which the ball bearing part 140 is disposed. As an example, a viscous fluid is injected into the respective guide grooves 131a, 131b, and 132a. As the viscous fluid, grease having excellent viscosity and lubrication characteristics may be used.

Figure 2:
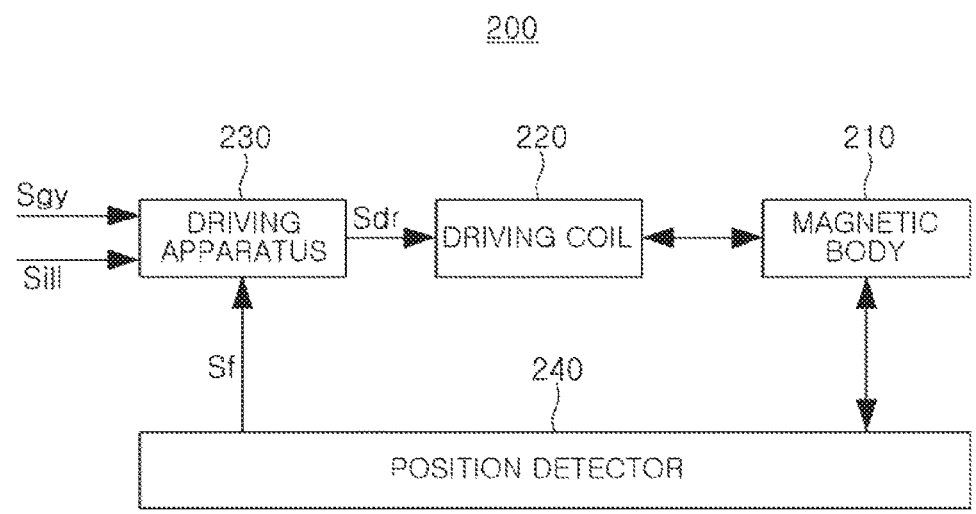
FIG. 2 is a block diagram of an actuator in the camera module, according to an embodiment.

FIG. 2 is a block diagram of an actuator in the camera module, according to an embodiment. An actuator 200 according to an embodiment of FIG. 2, which corresponds to the second actuator of FIG. 1, performs an optical image stabilization (OIS) function of the camera module.

The actuator 200 includes a magnetic body 210, a driving coil 220, a driving apparatus 230, and a position detector 240.

The driving apparatus 230 generates a driving signal Sdr according to a gyro signal Sgy, which is input from an external source, and a feedback signal Sf generated from the position detector 240, and provides or outputs the generated driving signal Sdr to the driving coil 220. The gyro signal Sgy is generated by a gyro sensor of the camera module or a mobile device employing the camera module. The gyro signal Sgy is processed to determine a target position of the lens barrel. The gyro signal Sgy is generated from a shaking of the camera module or the mobile device sensed by the gyro sensor. As an example, the gyro signal Sgy received at the driving apparatus 230 is generated by converting angular speed information, which is output from the gyro sensor, into angle information using an integrator, and removing a direct current (DC) offset and high frequency noise from the angle information, which is output from the integrator using a filter such as a high pass filter, a low pass filter, and the like.

In an example in which the driving signal Sdr from the driving apparatus 230 is applied to the driving coil 220, the lens barrel is moved in a direction perpendicular to the optical axis by an electromagnetic interaction between the driving coil 220 and the magnetic body 210. The position detector 240 detects a current position of the magnetic body 210 moved by the electromagnetic interaction between the magnetic body 210 and the driving coil 220 to generate the feedback signal Sf, and provides the feedback signal Sf to the driving apparatus 230.

Upon receipt of the feedback signal Sf, the driving apparatus 230 compares the gyro signal Sgy and the feedback signal Sf with each other to once again generate the driving signal Sdr. That is, the driving apparatus 230 is driven in a closed loop type in which the gyro signal Sgy and the feedback signal Sf are compared to each other. The driving apparatus 230 of the closed loop type is driven in a direction of decreasing error between the target position included in the gyro signal Sgy and the current position determined from the feedback signal Sf. One of the many advantages of the closed loop driving type is that linearity, accuracy, and repeatability are improved, compared to an open loop system type.

The driving apparatus 230 applies the driving signal to the driving coil 220 in a voice coil motor mode by having an H bride circuit, which is configured to be bidirectionally driven. The H bridge circuit includes a plurality of transistors, which are connected to the driving coil 220 in an H bridge form, and each of the plurality of transistors may be connected to the driving coil.

The driving apparatus 230 drives the driving coil 220 in one of a linear driving mode and a pulse width modulation (PWM) driving mode. The driving apparatus 230 applies a first control signal of a DC signal form to the transistors of the H bridge circuit at the time of linear driving, and applies a second control signal of a PWM signal form to the transistors of the H bridge circuit at the time of PWM driving.

When the driving apparatus drives the driving coil 220 in the linear driving mode, because the first control signal of the DC signal form is continuously applied to the transistors included in the H bridge circuit, an amount of current flowing through the H bridge circuit may be linearly adjusted, but power consumption may be increased.

Further, when the driving apparatus 230 drives the driving coil 220 in the PWM driving mode, because a pulse width of the second control signal of the PWM signal provided to the transistors included in the H bridge circuit is adjusted, the power consumption is relatively reduced, but the noise may be introduced into an image signal obtained by the image sensor due to a repetitive on/off operation of the transistors. At the time of PWM driving, in a general illuminance environment or a high illuminance environment, an influence caused by the noise is small, but in the low illuminance environment, there is a problem that the image is distorted by the noise.

The driving apparatus 230 of the camera module, according to an embodiment, determines a driving mode of the driving coil 220 according to external illuminance included in an illuminance signal Sill, at the time that the optical image stabilization is performed. As an example, the driving apparatus 230 determines that the driving coil 220 is driven in the PWM driving mode when a level of external illuminance is higher than a level of reference illuminance, and determines that the driving coil 220 is driven in the linear driving mode when the level of external illuminance is lower than the level of reference illuminance. In this example, an image processor provides the illuminance signal Sill to perform an image processing of the image signal. In addition, the image processor is included in the camera module or the mobile device.

Figure 3:
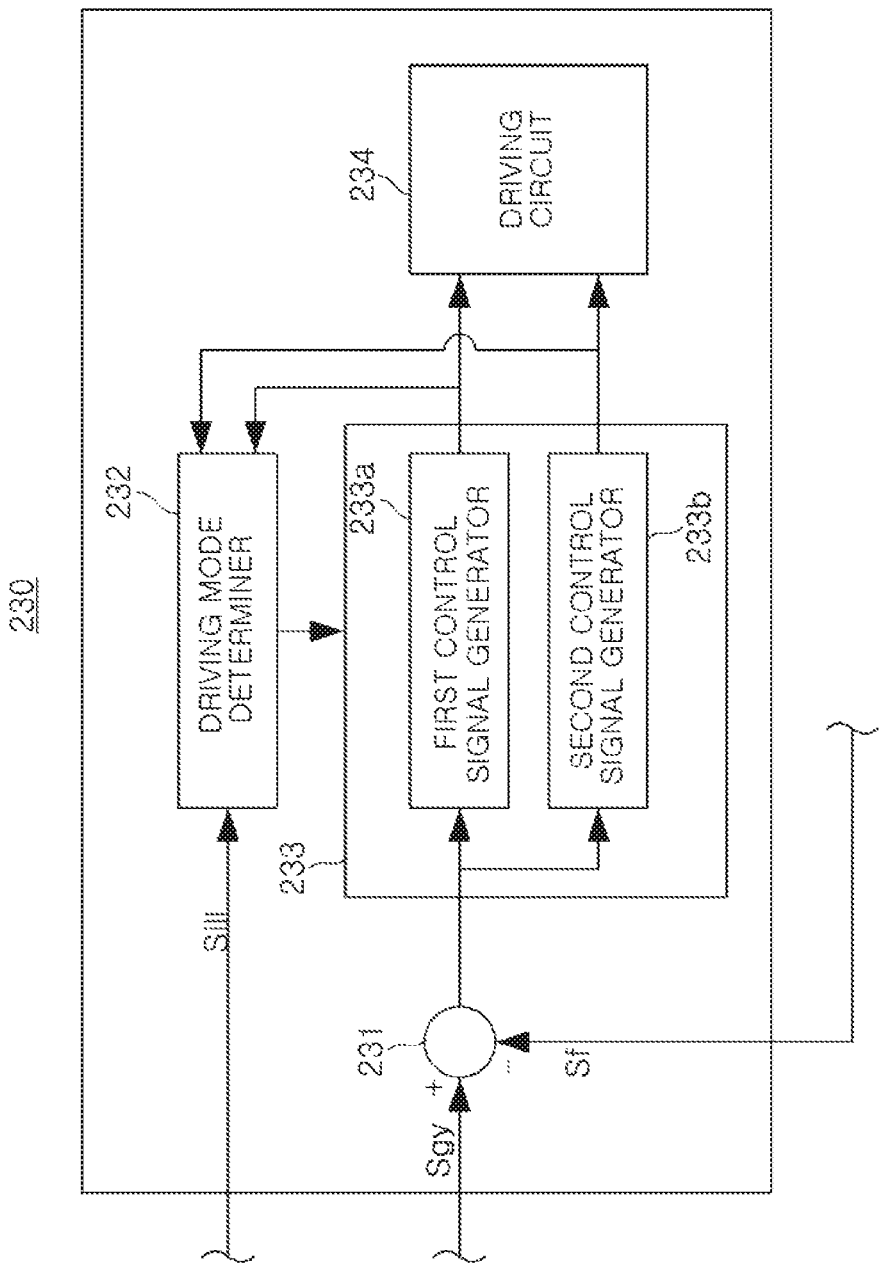
FIG. 3 is a block diagram of a driving apparatus in the actuator, according to an embodiment.

FIG. 3 is a block diagram of the driving apparatus in the actuator, according to an embodiment.

The driving apparatus 230, according to an embodiment, includes a comparator 231, a driving mode determiner 232, a controller 233, and a driving circuit 234.

The comparator 231 compares the gyro signal Sgy to the feedback signal Sf, generated from the position detector 240. The comparator 231 calculates an error value by comparing the target position of the lens barrel included in the gyro signal Sgy to the current position of the lens barrel included in the feedback signal Sf. A movement distance and a movement direction toward a direction perpendicular to the optical axis of the lens barrel is determined by the error value calculated at the comparator 231.

The driving mode determiner 232 determines the driving mode of the driving coil 220 by comparing the level of external illuminance of the illuminance signal Sill to the level of reference illuminance. As an example, the driving mode determiner 232 determines that the driving coil 220 is driven in the PWM driving mode upon the level of external illuminance of the illuminance signal Sill being higher than the level of reference illuminance, and determines that the driving coil 220 is driven in the linear driving mode upon the level of external illuminance of the illuminance signal Sill being lower than the level of reference illuminance.

The controller 233 generates a control signal according to the error value provided from the comparator 231 and the driving mode determined by the driving mode determiner 232.

The controller 233 includes a first control signal generator 233a and a second control signal generator 233b. The first control signal generator 233a and the second control signal generator 233b are selectively operated according to the driving mode determined by the driving mode determiner 232.

In response to the driving mode determiner 232 determining that the driving coil 220 is driven in the linear driving mode, the first control signal generator 233a generates a first control signal of a DC signal form. In response to the driving mode determiner 232 determining that the driving coil 220 is driven in the PWM driving mode, the second control signal generator 233b generates a second control signal of a PWM signal form.

Each of the first control signal generator 233a and the second control signal generator 233b includes a proportional integral derivative (PID) controller to generate the control signal in a PID mode or scheme. The first control signal generator 233a and the second control signal generator 233b perform or execute a control that is proportional to a magnitude of the error value in a current state according to a proportional control, perform or execute a control of decreasing error in a steady-state according to an integral control, and perform or execute a control of decreasing overshoot by preventing a rapid change according a derivative control.

The PID mode control is expressed by Equation 1 below. $K_P$ denotes a proportional control gain, $K_I$ denotes an integral control gain, and $K_D$ denotes a derivative control gain. The first control signal generator 233a and the second control signal generator 233b generate the control signal by applying the proportional control gain $K_P$, the integral control gain $K_I$, and the derivative control gain $K_D$, respectively to the error value corresponding to a difference between the target position of the lens barrel and the current position of the lens barrel, at the time of performing the PID mode control. Therefore, a level of the control signal may be determined according to the error value.

$$u(t) = K_P e(t) + K_I \int e(t)dt + K_D \frac{de(t)}{dt} \quad \text{[Equation 1]}$$

The driving circuit 234 generates the driving signal according to the control signal provided from the controller 233. The driving signal may be provided to both ends of the driving coil 220 in at least one form of a current and a voltage. The lens barrel is moved to the target position by the driving signal generated by the driving circuit 234.

The driving circuit 234 applies the driving signal to the driving coil 220 in a voice coil motor mode or scheme by including an H bride circuit that is bidirectionally driven. The H bridge circuit includes transistors that are connected to both ends of the driving coils in an H bridge form. In response to the driving circuit 234 being driven in the voice coil motor mode, the control signal provided from the controller 233 is applied to gates of the transistors included in the H bridge circuit.

In an example in which the first control signal of the DC signal form is provided from the first control signal generator 233a, the driving circuit 234 applies the driving signal of the DC signal form to the driving coil 220, and upon the second control signal of the PWM signal form being provided from the second control signal generator 233b, the driving circuit 234 applies the driving signal of the PWM signal form to the driving coil 220.

The controller gradually increases the level of the control signal to reduce switching loss of the transistors in the H bridge circuit and to prevent an inrush current at the time of an initial operation for moving the lens barrel to the target position. For example, the first control signal generator 233a gradually increases the first control signal of the DC signal form at the time of an initial operation of the linear driving mode, and the second control signal generator 233b gradually increases a duty of the second control signal of the PWM signal form at the time of an initial operation of the PWM driving mode. That is, at the time of the initial operation, in order for the level of the control signal to arrive at a specific level, a specific time may be required. Therefore, upon the level of external illuminance changing and the driving mode rapidly switching, a distortion may occur in the image signal due to discontinuity of the driving mode. Specifically, upon the driving mode switching from the linear driving mode to the PWM driving mode, because the level of the second control signal of the PWM driving mode does not arrive at the level of the first control signal of the linear driving mode, discontinuity may occur between the driving modes. In addition, upon the driving mode switching from the PWM driving mode to the linear driving mode, because the level of the first control signal of the linear driving mode does not arrive at the level of the second control signal of the PWM driving mode, discontinuity may occur between the driving modes.

The driving mode determiner 232 according to an embodiment compares deviation between the level of the control signal of a previous driving mode and the level of the control signal of a following driving mode upon the driving mode needing to be switched because the level of external illuminance has changed. As a result of the comparison, upon the deviation between the level of the control signal of the previous driving mode and the level of the control signal of the following driving mode being outside of a range of reference deviation, the previous driving mode is maintained. Thereafter, as a result of maintaining the previous driving mode, upon the level of the control signal of the following driving mode arriving at the level of the control signal of the previous driving mode and the deviation between the levels of both the control signals is within the range of the reference deviation, the driving mode is switched to the following driving mode.

The driving mode determining 232, according to an embodiment, determines the deviation between the first control signal of the DC signal form and the level of the second control signal of the PWM signal form by relatively comparing the level of the first control signal of the DC signal form to the level of the second control signal of the PWM signal form using the position of the magnetic body 210.

Figure 4:
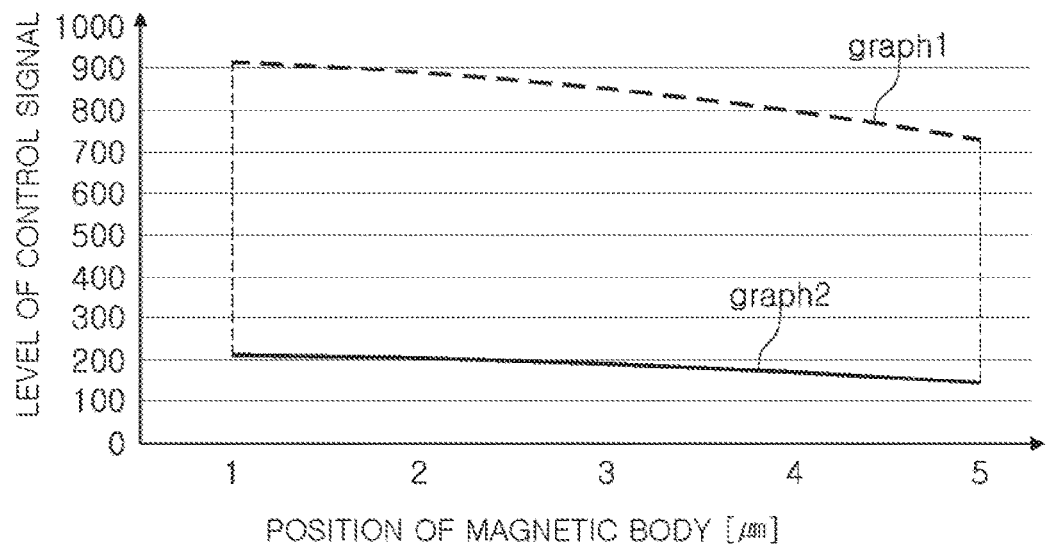
FIG. 4 is a graph illustrating a level of a control signal according to a position of a magnetic body, according to an embodiment.

FIG. 4 is a graph illustrating a level of a control signal according to a position of a magnetic body, according to an embodiment.

Referring to FIG. 4, FIG. 4 illustrates a graph (graph 1) of the first control signal of the DC signal form according to a position of the magnetic body, and a graph (graph 2) of the second control signal of the PWM signal form according to the position of the magnetic body.

In one example in which the magnetic body is moved in the range of 1 to 5 μm, in order to control the position of the magnetic body, the first control signal of the DC signal form has, for instance, a control level of 720 to 900, and the second control signal of the PWM signal form uses, for example, the control level of 150 to 200. That is, because the level of the first control signal and the level of the second control signal are increased or decreased in the same direction depending on the position of the magnetic body, the first control signal and the second control signal may be relatively compared with each other using the position of the magnetic body. Further, a relationship between the level of the first control signal and the level of the second control signal may be calculated according to a result of the relative comparison.

Figure 5:
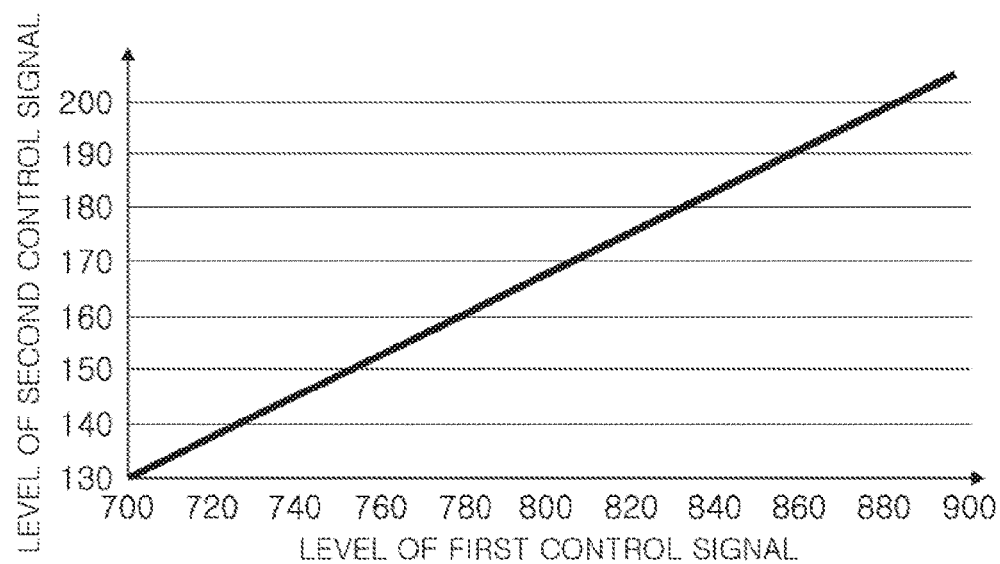
FIG. 5 is a graph illustrating a relationship between control signals, according to an embodiment.

FIG. 5 is a graph illustrating a relationship between control signals, according to an embodiment. Referring to FIG. 5, FIG a graph is illustrated of the second control signal of the PWM signal form to the first control signal of the DC signal form. The graph of FIG. 5 may be calculated from the graph (graph 1) of the first control signal of the DC signal form according to the position of the magnetic body, and the graph (graph 2) of the second control signal of the PWM signal form according to the position of the magnetic body of FIG. 4.

The driving mode determiner 232, according to an embodiment, calculates relationship information between the first control signal of the DC signal form and the second control signal of the PWM signal form according to the position of the magnetic body 210. Thereafter, as result of determination according to the calculated relationship information, upon deviation between the level of the control signal of the previous driving mode and the level of the control signal of the following driving mode being within reference deviation, the driving mode determiner 232 switches the driving mode to the following driving mode.

As set forth above, according to various embodiments, the actuator of the camera module is operated in one mode of the linear driving mode and the PWM driving mode according to the external illuminance, and removes discontinuity of the driving modes at the time of switching the driving mode, thus, preventing the distortion of the image signal.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator of a camera module, the actuator comprising:
    a magnetic body;
    a driving coil disposed to face the magnetic body; and
    a driving apparatus comprising a driving circuit connected to the driving coil, and configured to selectively provide one of a first control signal and a second control signal to the driving circuit according to a driving mode,
    wherein the driving apparatus is further configured to compare, using a position of the magnetic body, a level of a control signal of a previous driving mode with a level of a control signal of a following driving mode upon the driving mode being switched.

2. The actuator of claim 1, wherein the driving apparatus is further configured to maintain the previous driving mode, upon deviation between the level of the control signal of the previous driving mode and the level of the control signal of the following driving mode being outside of a range of reference deviation.

3. The actuator of claim 1, wherein the driving apparatus is further configured to switch the driving mode to the following driving mode, upon deviation between the level of the control signal of the previous driving mode and the level of the control signal of the following driving mode being within a range of reference deviation.

4. The actuator of claim 1, wherein the driving mode is determined according to an external illuminance.

5. The actuator of claim 4, wherein the first control signal drives the driving circuit in a linear driving mode, and the second control signal drives the driving circuit in a pulse width modulation (PWM) driving mode.

6. The actuator of claim 5, wherein the driving apparatus is further configured to generate the first control signal upon a level of the external illuminance being lower than a level of reference illuminance.

7. The actuator of claim 5, wherein the driving apparatus is further configured to generate the second control signal upon a level of the external illuminance being higher than the level of reference illuminance.

8. The actuator of claim 5, wherein the first control signal is a driving signal having direct current (DC) signal form that is applied to the driving coil, and
    the second control signal is a driving signal of a PWM signal form that is applied to the driving coil.

9. The actuator of claim 1, wherein the driving apparatus is further configured to perform an optical image stabilization (OIS) function by moving a lens barrel having the magnetic body attached thereto in a direction perpendicular to an optical axis.

10. The actuator of claim 1, wherein the driving circuit comprises transistors connected to the driving coil in an H bridge form, and
    the first control signal and the second control signal are provided to gates of the transistors.

11. The actuator of claim 4, wherein the external illuminance is provided from an image processor performing image processing on an image signal.

12. The actuator of claim 4, wherein the external illuminance is provided from an illuminance sensor.

13. A driving apparatus of a camera module, the driving apparatus comprising:
    a driving mode determiner configured to determine a driving mode of a driving coil based on an external illuminance;
    a controller configured to selectively generate one of a first control signal and a second control signal based on the driving mode; and
    a driving circuit configured to drive the driving coil based on the first control signal and the second control signal,
    wherein the driving mode determiner is further configures to compare, using a position of a lens barrel, a level of a control signal of a previous driving mode with a level of a control signal of a following driving mode upon the driving mode being switched and based on the external illuminance.

14. The driving apparatus of claim 13, wherein the controller is further configured to maintain the previous driving mode, upon deviation between the level of the control signal of the previous driving mode and the level of the control signal of the following driving mode being outside of a range of reference deviation.

15. The driving apparatus of claim 13, wherein the controller is further configured to switch the driving mode to the following driving mode, upon the deviation between the level of the control signal of the previous driving mode and the level of the control signal of the following driving mode being within a range of the reference deviation.

16. The driving apparatus of claim 13, wherein the driving circuit is further configured to drive the driving coil in a linear driving mode according to the first control signal, and to drive the driving coil in a PWM driving mode according to the second control signal.

17. An actuator of a camera module, the actuator comprising:
    a magnetic body;
    a driving coil disposed to face the magnetic body; and
    a driving apparatus comprising a driving circuit connected to the driving coil, and configured to selectively provide one of a first control signal and a second control signal to the driving circuit according to a driving mode, wherein the driving apparatus is further configured to selectively perform one of maintaining a previous driving mode and switching the driving mode to a following driving mode based on a comparison of a deviation between a level of a control signal of the previous driving mode and a level of a control signal of the following driving mode with a reference deviation.

* * * * *